United States Patent
Jhanb et al.

(10) Patent No.: US 9,806,960 B2
(45) Date of Patent: Oct. 31, 2017

(54) METHOD AND SYSTEM FOR ADJUSTING HEAVY TRAFFIC LOADS BETWEEN PERSONAL ELECTRONIC DEVICES AND EXTERNAL SERVICES

(71) Applicant: Google Inc., Mountain View, CA (US)

(72) Inventors: Subir Jhanb, Mountain View, CA (US); Tal Dayan, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 310 days.

(21) Appl. No.: 14/088,545

(22) Filed: Nov. 25, 2013

(65) Prior Publication Data
US 2015/0149610 A1    May 28, 2015

(51) Int. Cl.
| | |
|---|---|
| *G06F 15/173* | (2006.01) |
| *H04L 12/24* | (2006.01) |
| *H04L 12/26* | (2006.01) |
| *H04L 29/08* | (2006.01) |
| *H04L 29/06* | (2006.01) |

(52) U.S. Cl.
CPC .............. *H04L 41/50* (2013.01); *H04L 43/08* (2013.01); *H04L 43/16* (2013.01); *H04L 63/1408* (2013.01); *H04L 63/1458* (2013.01); *H04L 67/02* (2013.01); *H04L 67/10* (2013.01); *H04L 67/22* (2013.01); *H04L 67/28* (2013.01); *H04L 67/2842* (2013.01); *H04L 43/0852* (2013.01); *H04L 43/0894* (2013.01)

(58) Field of Classification Search
None
See application file for complete search history.

(56) References Cited

U.S. PATENT DOCUMENTS

| | | | | |
|---|---|---|---|---|
| 9,021,109 | B1* | 4/2015 | Gigliotti | ............ H04N 21/4431 |
| | | | | 709/217 |
| 9,058,210 | B2* | 6/2015 | Avalani | .................. G06F 9/5011 |
| 2003/0112752 | A1 | 6/2003 | Irifune et al. | |
| 2003/0188013 | A1* | 10/2003 | Nishikado et al. | ........... 709/238 |
| 2007/0077931 | A1 | 4/2007 | Glinka | |
| 2010/0131659 | A1 | 5/2010 | Narayana et al. | |
| 2010/0131668 | A1 | 5/2010 | Kamath et al. | |
| 2012/0023236 | A1 | 1/2012 | Backholm et al. | |

(Continued)

FOREIGN PATENT DOCUMENTS

WO    2008/112779 A2    9/2008

OTHER PUBLICATIONS

Guidelines for Web Content Transformation Proxies 1.0, printed from internet Nov. 3, 2013 www.w3.org/TR/ct-guidelines/.

(Continued)

*Primary Examiner* — Brian Whipple
*Assistant Examiner* — Gregory P Tolchinsky
(74) *Attorney, Agent, or Firm* — Fox Rothschild LLP

(57) ABSTRACT

A network traffic monitoring system monitors communications that a large number of personal electronic devices will direct to various services via various proxies. When a detection system determines that the volume of requests directed to at least one of the services exceeds a capacity limit threshold, a control system will command the proxies to instruct the devices to slow or stop the service requests until the system determines that it is clear to resume communication.

22 Claims, 3 Drawing Sheets

(56) References Cited

U.S. PATENT DOCUMENTS

| | | |
|---|---|---|
| 2012/0222117 A1 | 8/2012 | Wong et al. |
| 2012/0233656 A1 | 9/2012 | Rieschick et al. |
| 2012/0265873 A1 | 10/2012 | Iund et al. |
| 2012/0278889 A1 | 11/2012 | El-Moussa |
| 2013/0031191 A1 | 1/2013 | Bott |
| 2013/0031599 A1 | 1/2013 | Luna et al. |

OTHER PUBLICATIONS

Extended European Search Report dated May 31, 2017, for Application No. EP14864308.3.

* cited by examiner

METHOD AND SYSTEM FOR ADJUSTING HEAVY TRAFFIC LOADS BETWEEN PERSONAL ELECTRONIC DEVICES AND EXTERNAL SERVICES

BACKGROUND

The increasing number of personal electronic devices in the world and their formidable computational and networking capabilities creates new and greater stresses on communications networks. For example, a study performed in early 2013 estimated that over 180 million smartphones were in use in the United States. A software bug or malicious code that is replicated across multiple electronic devices can saturate or bring down major networks and services if the bug or code causes the devices to repeatedly and persistently submit requests to particular services. In addition, if a popular service experiences a brief outage, when the service comes back online a huge number of devices may simultaneously attempt to reconnect to the service. This sudden, heavy load can impose significant stresses on communication networks. While the service may protect itself from sudden heavy loads or other unusual activity with denial of service actions, this does not protect intermediary networks and third party services from the impact of a heavy traffic load.

This document describes methods and systems that are directed to solving at least some of the problems described above, and/or additional problems.

SUMMARY

In an embodiment, a network traffic monitoring system monitors communications that a large number of personal electronic devices will direct to various services via various proxies. When a detection system determines that the volume of requests directed to at least one of the services exceeds a capacity limit threshold, it will cause the proxies to instruct the devices to slow or stop the service requests until the system determines that it is clear to resume communication.

For example, in an embodiment, a system for controlling traffic between a number of electronic devices and one or more services may include one or more systems, such as a detection system and a control system, each comprising one or more processors and a non-transitory computer readable medium containing programming instructions that, when executed, are configured to cause one or more detection system processors to perform a method. The system may monitor information traveling across a network relating to communicated service requests that pass through various proxy units. The system may determine whether the information indicates that a volume of the service requests directed to one of the services violates a capacity limit rule. Upon identifying that the volume violates the capacity limit rule, the system identify a set of the proxy units that are affected by the violation of the capacity limit rule, and it may generate an alert that includes an identification of a restricted service request and an identification of the affected proxy units. Upon generation or receipt of the alert, the affected proxy units may send a first command to some or all of the electronic devices to reduce a frequency of the restricted service requests to the service until a second command is received. The reduced frequency may be to halt all delivery of the service requests, or to slow but not halt the service requests.

The determination of whether the capacity limit rule has been violated may include, for example: determining whether at least a threshold number of service requests are directed to the service; determining whether at least a threshold number of identical service requests are directed to the service and at least one additional service; determining whether at least a threshold number of identical service requests are directed to the service; or determining whether communications to the service are exhibiting at least a threshold latency level.

In response to receiving the instructions, the affected proxy units may send the first command to a group of the electronic devices. The proxy units may determine a maximum pass-through rate and cache received instances of the restricted service requests so that a frequency of the restricted service requests passed through to the service does not exceed the maximum pass through-rate. Alternatively, the affected proxy units may simply block the restricted service requests from being passed through to the service. In response to receipt of a resume communication message, the affected proxy units may discontinue the caching, deliver the cached service requests to the service, generate a second command to resume delivery of the restricted service requests, and send the second command to the group of electronic devices.

When the electronic devices receive the first command, they may implement the first command by stopping or slowing delivery of the restricted service requests. The devices may resume normal transmission of the restricted service requests upon receipt of the second command.

In addition, based on the monitored information, the system may detect when the service requests are increasing in frequency and responses from the service to the service requests are experiencing an increase in latency. When increases in frequency and/or latency are detected, the system may adjust the capacity limit rule to reduce a frequency threshold or a latency level threshold in the capacity limit rule.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "personal electronic device" refers to an electronic device that includes a processor; non-transitory, computer-readable memory; network communication hardware such as transceivers that send data to and receive data from external services via a communication network; and one or more software applications comprising programming instructions that, when executed by the processor, cause the device's processor to perform one or more operations according to the programming instructions. Examples of personal electronic devices include smartphones, personal digital assistants, laptop computers, tablet computers, gaming systems, smart televisions, networked cameras and media players, wearable computing devices such as wristwatches and eyeglasses containing computing components, in-vehicle onboard computers and the like.

A "service" refers to a software function that is provided to a number of personal electronic devices from a network address via a communications network such as the Internet. The service will be external to the devices, and will include processing functions and programming instructions that are executed at a location that is remote from the personal electronic devices. Examples of services include cloud-based electronic mail services, online video or music streaming services, online video or audio chat or meeting services, photo or other file sharing and/or storage services, cloud-based document management services, map services, search services and other Web services.

Figure 1:
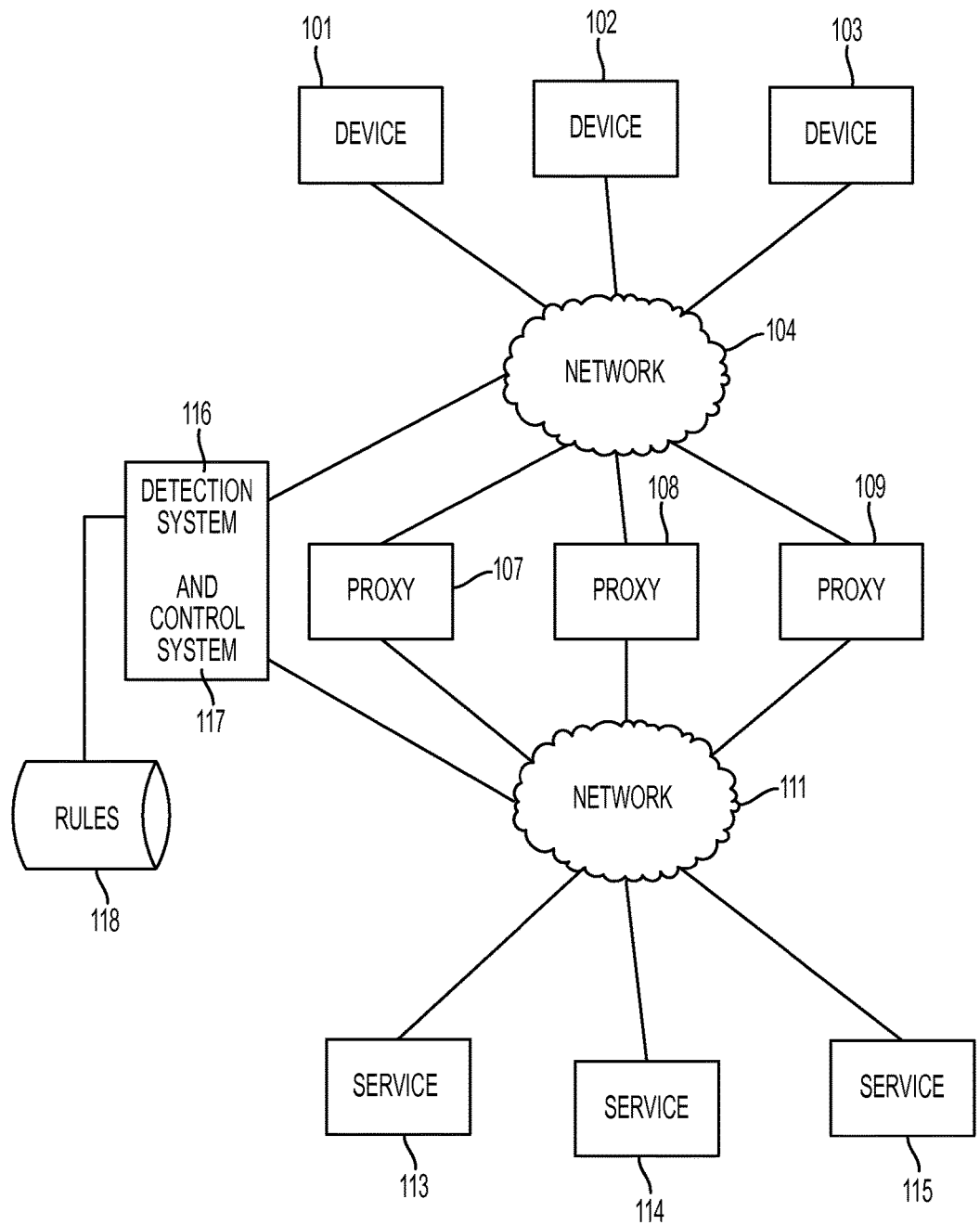
FIG. 1 illustrates various component of a system in which electronic devices communicate with services via proxies, along with other elements of a monitoring and traffic control system.

FIG. 1 shows an example of a system of networked devices and services. Various personal electronic devices 101, 102, 103 may communicatively connect to various services 113, 114, 115 via one or more communication networks 104, 111. The number of personal electronic devices may include a very large number of devices. Each of these devices may use browser software and/or mobile applications to access one or more external services such as email, media streaming, or video or audio conferencing services.

Communication between the devices and services will pass through intermediary control units, referred to in this document as "proxy units" or "proxies" 107, 108, 109. Proxies are intermediate electronic devices that receive communications from devices and participate in the control of whether and when to pass the communications to a destination service. Proxies may be devices such as actual networking proxies, smart network routers, software running on computers, or other devices that intercept, relay and/or monitor communications between the devices and services. The proxies communicate with the mobile devices and the services via networks 104, 111 respectively.

A detection system 116 may monitor various elements of the network communications, such as traffic loads in any portion of the networks, the volume or type of traffic directed to any individual service, or other parameters of the system. The detection system 116 may include automatic monitoring elements and/or manual monitoring aspects. A control system 117 is in communication with the detection system and the proxies, and it includes a processor and programming instructions that, when executed, cause the control system to control behavior of the proxies. The programming instructions of the detection system and/or control system may implement a set of rules 118 that can be used to influence the behavior of the overall network of devices. The components and instructions of the detection system 116, control system 117 and rules 118 may be part of one or more of the proxies 107, 108, 109, or any or all of these components may be separate from—but in communication with—the proxies. In addition, the detection system 116 and control system 117 may be separate devices, or they may be integrated within a single detection and control system device or set of devices.

The detection system 116 and control system 117 use the rule set 118 to determine what steady state parameters are desired, such as quality of service parameters, per service rate limits, and other limits. When the detection system 116 determines that the monitored parameters are violating one or more of these rules, meaning that one or more portions of the system—such as a communication link or a service—is becoming overloaded, it may direct the control system 117 to command one or more of the proxies 107, 108, 109 to control that traffic by reducing the number of communications that the devices launch into the system. The affected proxies will implement these commands by (1) halting, or caching and slowing the frequency of, communications from the proxy to the affected service or services, and (2) transmitting signals to the personal electronic devices to halt or slow the frequency of service requests to the affected service or services.

By causing the personal electronic devices themselves to stop or slow traffic, not only are the services protected, but stress on the network between the devices and services is also reduced as it helps the network avoid the heavy traffic load associated with repeated and persistent service requests. In addition, the devices themselves may benefit from not using processing resources and battery life to send repeated service requests that the service will not handle. Instead, the devices will hold the requests until the affected service is able or willing to accept the request. Other services and service requests will not be restricted, and communication between the devices and non-affected services may continue in a normal manner.

In an embodiment, one or more of the proxies may be of the protocol transforming type which control the appearance, structure or flow of Web applications between services and personal electronic devices. Content transformation proxies may convert Web pages that are designed for desktop computers to a form suitable for the mobile electronic devices. These actions will typically be done in accordance with applicable standards such as the WC3 Guidelines for Web Content Transformation Proxies. If the detection service notices that one or more proxies receives an abnormally high number of service requests that are directed to a particular service from non-browser based applications, the detection service may, via the control service, cause the affected proxies to stop relaying the requests to the affected service and to signal the personal electronic devices to stop sending the requests until a "resume transmission" or similar signal is received.

Proxies may be located in a single location or distributed across one or more geographic regions. Some or all of the proxies may be heterogeneous, or they may be dissimilar so long as they can all perform the function of signaling the personal electronic devices to halt or slow service requests. In some embodiments, the proxies will be geographically distributed in locations that are physically close to the certain requesting devices, in order to address traffic load as quickly as possible at the device level.

The rules and commands may be implemented on any suitable level of granularity, such as per device, per service, per proxy or per port. The method by which a proxy may signal a device to halt or slow service requests may vary based on configuration of the device. For example, if a device includes an application that is programmed to respond to certain commands by halting or slowing service requests, the proxies may send such devices signals that correspond to those commands. For example, the proxies may signal the devices by returning an error status to each device in response to a service request, by varying a handshake pattern between the proxies and devices, or by sending an explicit halt service or slow service command to the devices.

Figure 2:
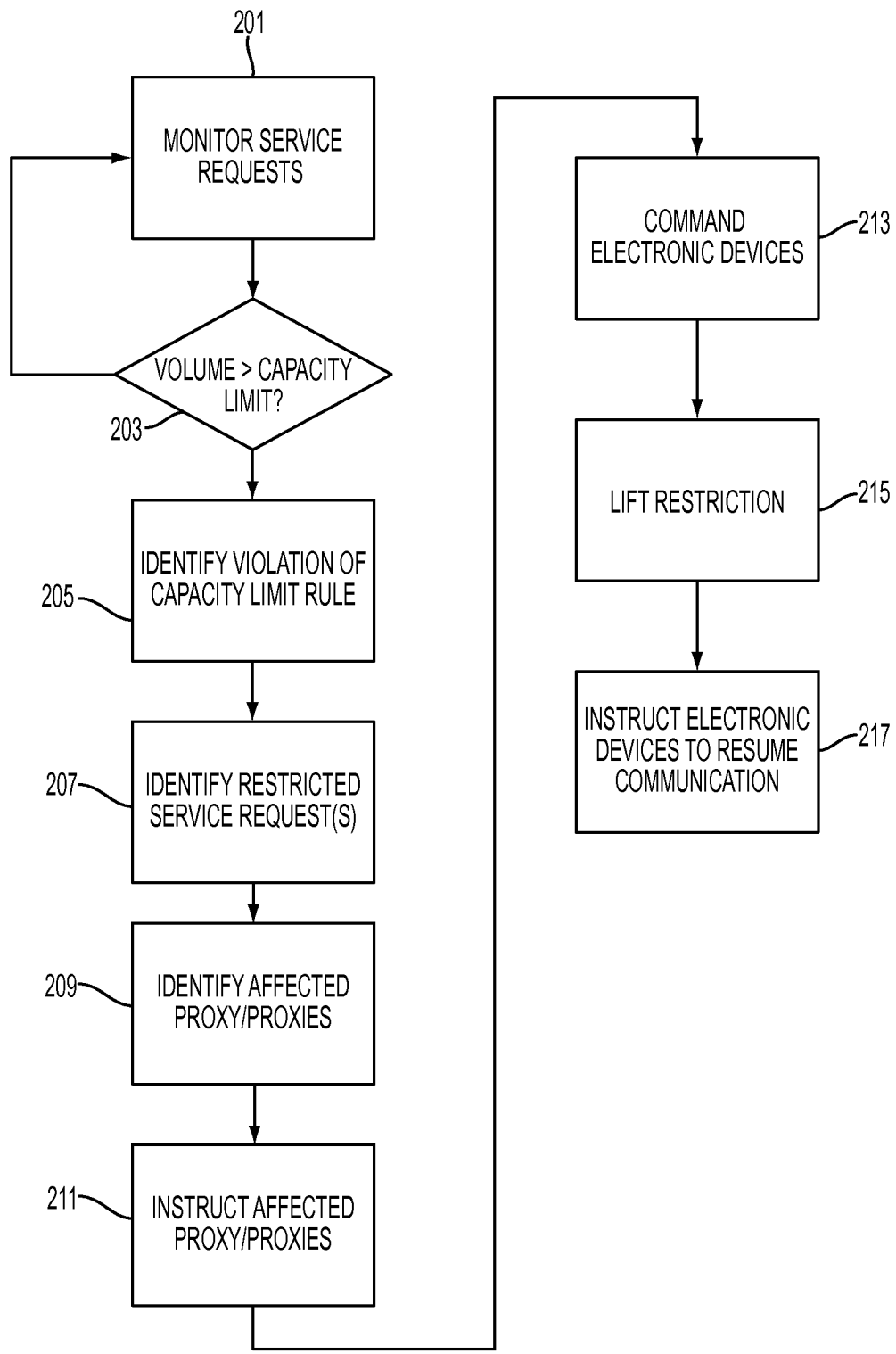
FIG. 2 illustrates various steps that a network traffic monitoring and control system may implement.

FIG. 2 is a diagram describing a process flow that includes various elements described above. According to various embodiments, one or more detection services will monitor information relating to communicated service requests that pass from a large number of personal electronic devices to various services through various proxy units (step 201). The monitoring service will have access to a rule set and will determine whether a volume of the service requests directed to one or more of the services violates a capacity limit rule (step 203). The rules may be specific to a particular service, such as a rule that a threshold number of service requests be submitted within a particular time period. Or, the rules may be generally applicable to multiple services. For example, a rule might be to apply a traffic limiting instruction if the monitored number of queries per second directed to a specific service, or the amount of data flowing to and from a specific service (i.e., bandwidth) exceeds a threshold. Similar rules may be applied to a specific group of services, or to an aggregate of all services. The rule also may trigger a traffic limiting instruction if a sudden spike in a particular type of query is detected. Examples include a threshold percentage increase in the number of queries per second for profile data.

Optionally, the detection service and/or other components of the system may dynamically update the rules, or the thresholds resulting from or used by the rules, based on monitored data. For example, if the system determines that communications directed to a particular service are both increasing in frequency (e.g., number of messages per time period) and resulting in longer wait time for responses in the service requests (i.e., increases in latency), then the system may reduce the frequency threshold at which it will impose a "reduce frequency command. The system may apply any suitable algorithm to this combination of variables, and/or other variables, to determine when to adjust the rules or thresholds. Rules can be applied by the monitoring service, or they can be distributed to the proxies, such as in a distributed configuration file that is pushed while the proxy systems are running, or in batch form with periodic rule updates. In such a situation, the proxies may analyze the monitored data and apply the rules themselves.

Upon identifying that the monitored volume violates a capacity limit rule (step 205), the detection system will identify one or more of the service requests in the volume as a restricted service request (step 207). The system may do this based on any suitable method, such as by reviewing the monitored volume and identifying the type of service request that makes up the largest portion of the volume, by identifying the service or services that are affected and restricting any future service request to the affected service (s), or by other suitable methods. The system may determine that the capacity limit rule is violated based on criteria such as whether at least a threshold number of service requests of any type are directed to the service; whether at least a threshold number of identical service requests are directed to both the service and at least one additional service; whether at least a threshold number of identical service requests are directed to the service; or whether communications to the service are exhibiting at least a threshold latency level.

The system will also determine which of the proxy units are affected proxy units (step 209). For example, a proxy unit may be considered to be an affected proxy unit if it received any of the traffic from the monitored volume that violated the capacity limit rule, or if it received at least a threshold percentage of such traffic.

The system will then instruct the proxy units (step 211) to command the personal electronic devices to reduce the frequency of the restricted service requests to the affected service(s) by either slowing the service requests or halting them altogether. The proxy units will send the commands to the personal electronic devices (step 213). Upon receipt of the commands, the devices may implement the first command by stopping or slowing delivery of the restricted service requests.

If the instructions are to reduce, but not eliminate, the restricted service requests, then in connection with sending the commands to the personal electronic devices, the affected proxy units may determine a maximum passthrough rate. This may be determined based on preexisting instructions, instructions received from the control service, or any other suitable method. The affected proxy units will cache received instances of the restricted service request and release the cached instances at a reduced rate so that the rate of delivery of the restricted service requests passed through to the service does not exceed the maximum pass throughrate. If the instructions are to halt the restricted service requests (i.e., reduce the frequency to zero), the affected proxy units will simply halt passing through any instances of the restricted service requests until instructed otherwise.

If and when the detection system determines that traffic may be resumed, it may send a resume communication message to the proxy units to lift the restriction on the restricted service requests (step 215). This determination may be done by any number of methods, such as based on a time limit criterion, based on signals from the affected service that it has increased a capacity level, or by other suitable means. Optionally, the instructions may be to lift the restriction and replace it with an updated restriction, such as one that allows a higher frequency or rate of communication but still not an unrestricted frequency or rate of communication. In this manner, service requests may be brought on line gradually, to avoid a spike or overloading of the service after the restriction is lifted.

In response to receiving the resume communication message, the affected proxies may discontinue any caching or increase the frequency by which messages are released from the cache, and they may generate a new command to no longer reduce the frequency of the restricted service requests. The affected proxies will send the new command to the personal electronic devices (step 217). The electronic devices will resume normal communication of the restricted service requests upon receipt of the new command.

Figure 3:
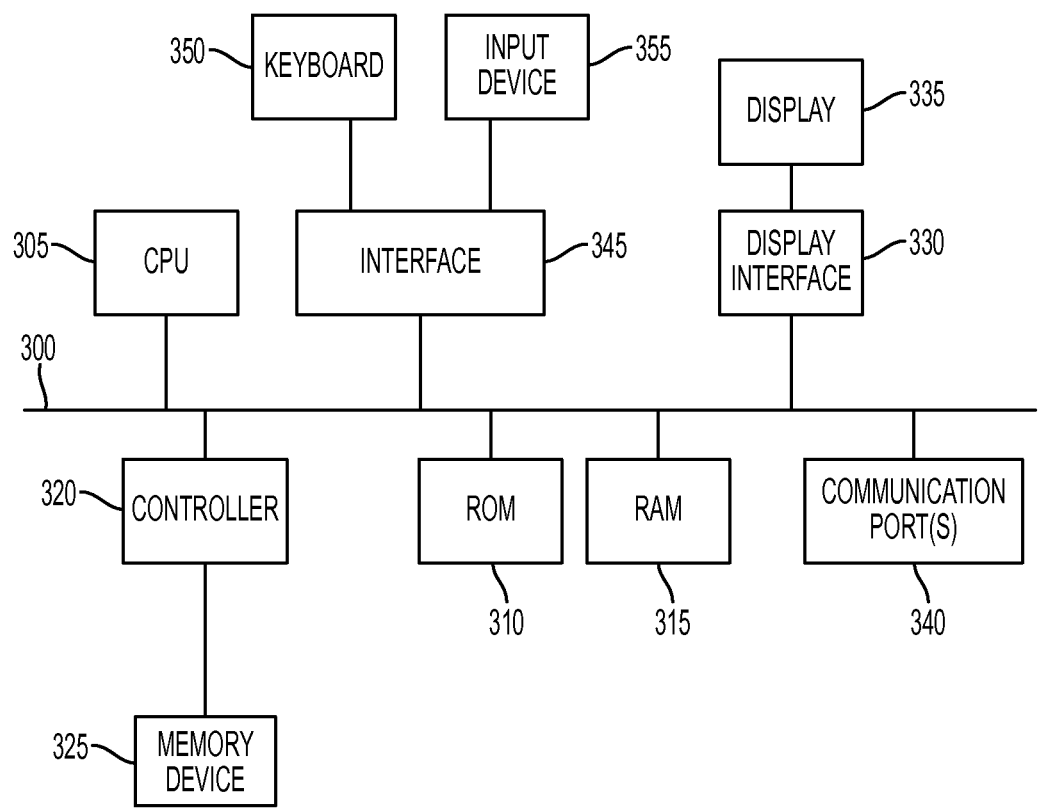
FIG. 3 illustrates various hardware components that may be included with various aspects of the systems described below.

FIG. 3 depicts an example of internal hardware elements, some of which may be included in any of the components discussed above, such as the proxy units, the personal electronic devices and/or the equipment that is used to provide the services, detection or control. A bus 300 is a route for transferring information between the various components of the hardware. A processor or CPU 305 is a central processing unit of the system, performing calculations and logic operations required to execute a program. Read only memory (ROM) 310 and random access memory (RAM) 315 constitute examples of memory devices.

A controller 320 interfaces with one or more optional memory devices 325 that service as data storage facilities to the system bus 300. These memory devices 325 may include, for example, a CD drive, a hard drive, flash memory, a USB drive or another type of device that serves as a data storage facility. Additionally, the memory devices 325 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, flash memory, memory card, USB drive, a distributed computer storage platform such as a cloud-based architecture, optical disc storage medium and/or other recording medium.

A display interface 330 may permit information received via the bus 300 to be displayed on a display 335 in audio, visual, graphic or alphanumeric format. Communication with external devices may occur using various communication ports 340. A communication port 340 may be connected to a communications network, such as the Internet, a local area network or a cellular telephone data network.

The hardware may also include an interface 345 which allows for receipt of data from input devices such as a keyboard 350 or other input device 355 such as a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of controlling traffic between a plurality of electronic devices and one or more services, the method comprising, by one or more processors:
   monitoring information relating to communicated service requests that pass from a plurality of electronic devices to a service through each of a plurality of proxy units;
   determining whether the information indicates that a volume of the service requests directed to the service violates a capacity limit rule, wherein each service request in the volume of the service requests is associated with a type; and
   upon determining that the volume violates the capacity limit rule:
      identifying one or more of the service requests in the volume as a restricted service request by identifying the type of service request that makes up a largest portion of the volume,
      determining which of the proxy units are affected proxy units,
      generating instructions to send a first command to a plurality of the electronic devices to reduce a frequency of the restricted service requests to the service until a second command is received, and
      sending the instructions to the affected proxy units.

2. The method of claim 1, wherein the determining whether the volume of the service requests violates the capacity limit rule comprises one or more of the following:
   determining whether at least a threshold number of the communicated service requests are directed to the service;
   determining whether at least a threshold number of identical service requests are directed to the service and at least one additional service; or
   determining whether at least a threshold number of identical service requests are directed to the service.

3. The method of claim 1, wherein the determining whether the volume of the service requests violates the capacity limit rule comprises determining whether communications to the service are exhibiting at least a threshold latency level.

4. The method of claim 1, further comprising, by each of the affected proxy units, in response to receiving the instructions:
   sending the first command to the electronic devices, wherein the first command is to reduce the frequency of, but not to halt, the restricted service requests;
   determining a maximum pass-through rate, and caching received instances of the restricted service requests so that a frequency of the restricted service requests passed through to the service does not exceed the maximum pass through-rate; and
   in response to receipt of a resume communication message:
      discontinuing the caching and delivering the cached service requests to the service,
      generating a second command to resume delivery of the restricted service requests; and
      sending the second command to the electronic devices.

5. The method of claim 1, further comprising, by each of the affected proxy units, in response to receiving the instructions:
   sending the first command to the electronic devices, wherein the first command is to reduce the frequency to zero;
   blocking all instances of the restricted service request until a resume communication message is received; and
   upon receipt of the resume communication message:
      discontinuing the blocking,
      generating a second command to resume delivery of the restricted service requests, and
      sending the second command to the electronic devices.

6. The method of claim 1, further comprising, by the electronic devices:
   upon receipt of the first command, implement the first command by stopping or slowing delivery of the restricted service requests; and
   resume normal communication of the restricted service requests upon receipt of a second command to resume normal communication.

7. The method of claim 1, wherein the first commands comprise one or more of the following:
   an instruction to slow or stop the restricted service requests;
   an error message that the electronic devices will recognize as corresponding to a command to slow or stop the restricted service requests; or
   an altered handshake pattern that the electronic devices will recognize as corresponding to a command to slow or stop the restricted service requests.

8. The method of claim 1, further comprising:
   based on the monitoring, detecting both that the service requests are increasing in frequency and that responses from the service to the service requests are experiencing an increase in latency; and
   in response to the detecting, adjusting the capacity limit rule to reduce a frequency threshold or a latency level threshold in the capacity limit rule.

9. The method of claim 1, further comprising:
   by each of the affected proxy units, in response to receiving the instructions, sending the first command to the personal electronic devices;
   by the electronic devices in response to the first command, implement the first command by stopping or slowing delivery of the restricted service requests;
   by each of the affected proxy units:
      caching or blocking restricted service requests until a resume communications message is received, and in response to receipt of a resume communication message, resuming delivery of the restricted service requests, and sending the second command to the electronic devices, and by the electronic devices in response to the second command, resuming normal communication of the restricted service requests.

10. A system for controlling traffic between a plurality of electronic devices and one or more services, the system comprising:

a detection system comprising one or more detection system processors and a non-transitory computer readable medium containing programming instructions that, when executed, are configured to cause one or more of the detection system processors to:

monitor information relating to communicated service requests that pass through each of a plurality of proxy units, determine whether the information indicates that a volume of the service requests directed to one of the services violates a capacity limit rule, wherein each service request in the volume of the service requests is associated with a type, and upon determining that the volume violates the capacity limit rule:

identify one or more of the service requests in the volume as a restricted service request by identifying the type of service request that makes up a largest portion of the volume, and identify a set of the proxy units that are affected by the violation of the capacity limit rule, and generate an alert, wherein the alert comprises an identification of the one or more restricted service requests and an identification of the affected proxy units; and a control system comprising one or more control system processors and a non-transitory computer readable medium containing programming instructions that, when executed, are configured to cause one or more of the control system processors to:

upon receipt of the alert from the detection service, instruct the affected proxy units to send a first command to a group of the electronic devices to reduce a frequency of the restricted service requests to the service until a second command is received.

11. The system of claim 10, wherein the instructions that cause one or more of the detection system processors to determine whether the volume of the service requests violates the capacity limit rule comprise instructions to determine one or more of the following:

whether at least a threshold number of service requests are directed to the service;

whether at least a threshold number of identical service requests are directed to the service and at least one additional service;

whether at least a threshold number of identical service requests are directed to the service; or whether communications to the service are exhibiting at least a threshold latency level.

12. The system of claim 10, further comprising the affected proxy units, each comprising a processor and a non-transitory computer readable medium containing programming instructions that, when executed, are configured to cause the associated affected proxy unit to, in response to receiving the instructions:

send the first command to the group of electronic devices, wherein the first command is to reduce the frequency of, but not to halt, the restricted service requests;

determine a maximum pass-through rate, and cache received instances of the restricted service requests so that a frequency of the restricted service requests passed through to the service does not exceed the maximum pass through-rate; and in response to receipt of a resume communication message:

discontinue the caching and deliver the cached service requests to the service, generate a second command to resume delivery of the restricted service requests, and send the second command to the group of electronic devices.

13. The system of claim 10, further comprising the affected proxy units, each comprising a processor and a non-transitory computer readable medium containing programming instructions that, when executed, are configured to cause the associated affected proxy unit to, in response to receiving the instructions:

send the first command to the group of electronic devices, wherein the first command is to reduce the frequency to zero;

block all instances of the restricted service request until a resume communication message is received from the control service; and upon receipt of the resume communication message:

discontinue the blocking, generate a second command to no longer reduce the frequency of the restricted service requests, and send the second command to the group of electronic devices.

14. The system of claim 10, wherein the instructions to generate the first commands comprise instructions to generate one or more of one or more of the following:

an instruction to slow or stop the restricted service requests;

an error message that the electronic devices will recognize as corresponding to a command to slow or stop the restricted service requests; or an altered handshake pattern that the electronic devices will recognize as corresponding to a command to slow or stop the restricted service requests.

15. The system of claim 10, further comprising the group of electronic devices, wherein each of the devices in the group comprises a device processor and a non-transitory computer readable medium containing programming instructions that, when executed, are configured to cause the device processor to:

upon receipt of the first command, implement the stop command by stopping or slowing delivery of the restricted service requests; and resume normal transmission of the restricted service requests upon receipt of the second command.

16. The system of claim 10, further comprising additional instructions that cause the one or more detection system processors to:

based on the monitored information, detect when the service requests are increasing in frequency and responses from the service to the service requests are experiencing an increase in latency; and in response to the detecting, adjust the capacity limit rule to reduce a frequency threshold or a latency level threshold in the capacity limit rule.

17. A system for controlling traffic between a plurality of electronic devices and one or more services, the system comprising:
- one or more processors and a non-transitory computer readable medium containing programming instructions that, when executed, are configured to cause one or more of the processors to:
  - monitor information relating to communicated service requests that pass through each of a plurality of proxy units,
  - determine whether the information indicates that a volume of the service requests directed to a service violates a capacity limit rule, wherein each service request in the volume of the service requests is associated with a type,
  - upon determining that the volume violates the capacity limit rule:
    - identify one or more of the service requests in the volume as a restricted service request by identifying the type of service request that makes up a largest portion of the volume, and
    - identify a set of the proxy units that are affected by the violation of the capacity limit rule, and generate an alert, wherein the alert comprises an identification of a restricted service request and an identification of the affected proxy units, and
  - instruct the affected proxy units to send a first command to a group of electronic devices to reduce a frequency of the restricted service requests to the service until a second command is received.

18. The system of claim 17, further comprising additional programming instructions that, when executed, are configured to cause one or more of the processors to, in response to the instructions:
- send the first command to the group of electronic devices, wherein the first command is to reduce the frequency of, but not to halt, the restricted service requests;
- determine a maximum pass-through rate, and cause the affected proxy units to cache received instances of the restricted service requests so that a frequency of the restricted service requests passed through to the service does not exceed the maximum pass through-rate; and
- in response a resume communication message:
  - cause the affected proxy units to discontinue the caching and deliver the cached service requests to the service,
  - generate a second command to resume delivery of the restricted service requests, and
  - send the second command to the group of electronic devices.

19. The system of claim 17, further comprising additional programming instructions that, when executed, are configured to cause one or more of the processors to, in response to receiving the instructions:
- send the first command to the group of electronic devices, wherein the first command is to reduce the frequency to zero;
- cause the affected proxy units to block all instances of the restricted service request until a resume communication message is received from the control service; and
- upon receipt of the resume communication message:
  - cause the affected proxy units to discontinue the blocking,
  - generate a second command to no longer reduce the frequency of the restricted service requests, and
  - send the second command to the group of electronic devices.

20. The system of claim 17, further comprising additional instructions that, when executed, are configured to cause one or more of the processors to:
- based on the monitored information, detect when the service requests are increasing in frequency and responses from the service to the service requests are experiencing an increase in latency; and
- in response to the detecting, adjust the capacity limit rule to reduce a frequency threshold or a latency level threshold in the capacity limit rule.

21. The method of claim 1, wherein identifying one or more of the service requests in the volume as a restricted service request further comprises identifying a service request as the restricted service if a violation of the capacity limit rule affects the service request.

22. The system of claim 10, wherein the instructions to identify one or more of the service requests in the volume as a restricted service request further comprises identifying a service request as the restricted service if a violation of the capacity limit rule affects the service request.

* * * * *

UNITED STATES PATENT AND TRADEMARK OFFICE
CERTIFICATE OF CORRECTION

| | | |
|---|---|---|
| PATENT NO. | : 9,806,960 B2 | Page 1 of 1 |
| APPLICATION NO. | : 14/088545 | |
| DATED | : October 31, 2017 | |
| INVENTOR(S) | : Subir Jhanb et al. | |

It is certified that error appears in the above-identified patent and that said Letters Patent is hereby corrected as shown below:

In the Claims

• In Claim 9, at Column 8, Line 61, the word "personal" is hereby deleted.

• In Claim 10, at Column 9, Line 43, the term "detection service" is hereby changed to "detection system".

• In Claim 16, at Column 10, Line 63, the phrase "from the service" is hereby changed to "from the one or more services".

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*